June 24, 1930. W. A. DALEY 1,767,652
TUBE ASSEMBLY FOR HEAT TRANSFER DEVICES
Filed April 23, 1927
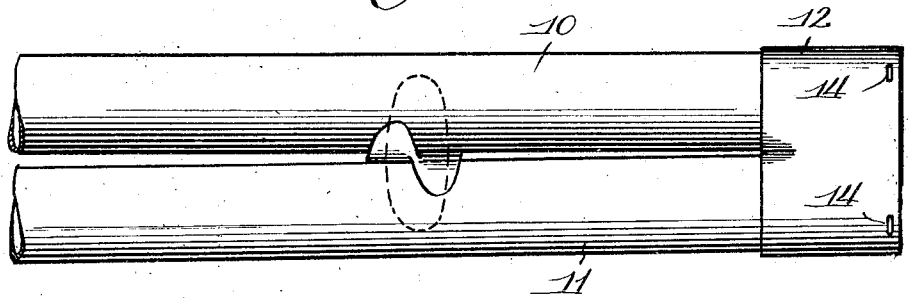
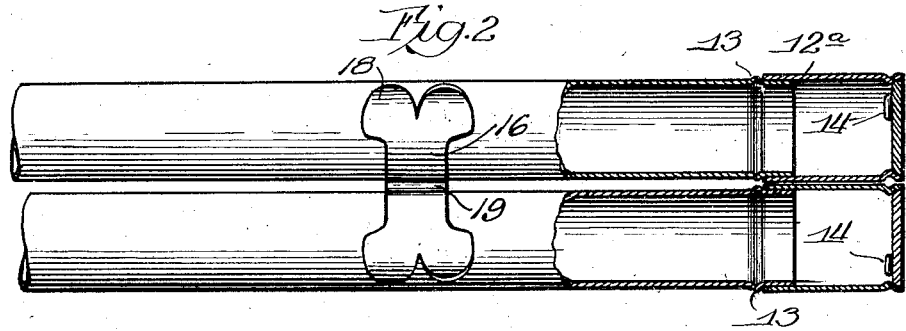
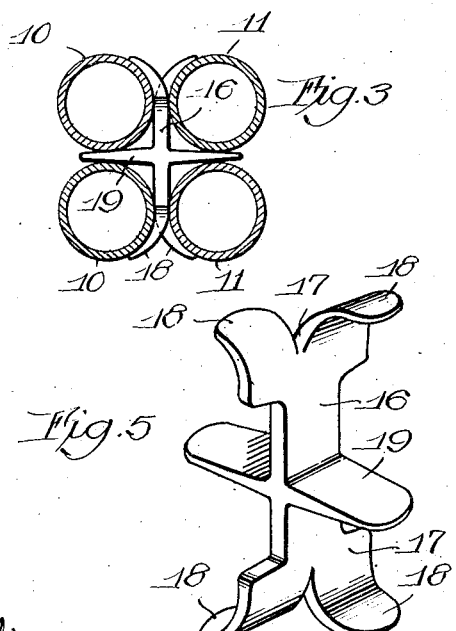
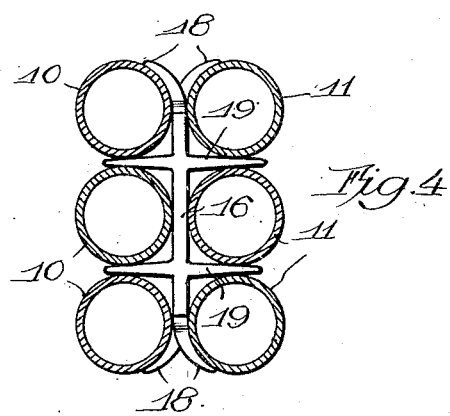
Inventor,
Walter A. Daley Patented June 24, 1930

1,767,652

UNITED STATES PATENT OFFICE

WALTER A. DALEY, OF CHICAGO, ILLINOIS, ASSIGNOR TO BELL & GOSSETT COMPANY, OF CHICAGO, ILLINOIS, A CORPORATION OF ILLINOIS

TUBE ASSEMBLY FOR HEAT-TRANSFER DEVICES

Application filed April 23, 1927. Serial No. 186,062.

My present invention relates to improvements in tube assembly for heat transfer devices, and has more particular relation to the provision of means for assemblying and securing together tubes comprising a portion of an auxiliary water heater. The particular object of my invention is the provision of simple and effective means for spacing and securing together groups of pairs of tubes which are joined together and communicate at one end. It has been found advantageous both on account of manufacturing and installing considerations to provide as a unit of tube assembly a group or pair of tubes of equal length which are secured together so as to effect communication at one end. The non-communicating ends of the tubes forming such a pair are secured in a suitable head or header, but inasmuch as such tubes have relatively considerable length, that is, ten, twelve, fourteen and more feet, it is highly desirable to properly space the tubes of the pairs of such tubes and the tubes of adjacent pairs intermediate their ends, and to secure all of the tubes in the desired grouping so that the combined rigidity of the respective tubes will provide a group much more rigid than any of the single tubes or pairs of tubes would otherwise be. Sufficient rigidity in the groups of tubes is desirable not only during installation but also for preventing displacement through expansion and contraction and through circulation both through and about the tubes.

As will hereafter be seen my spacing or assembling means is suitable for assembling two, three or any number of pairs of tubes as may be desired in a particular group. The structure embodying my invention is illustrated in the accompanying drawing in which—

Fig. 1 is a side view of a single pair of tubes, the means for spacing and assembling the several pairs being shown in plan in full and dotted lines.

Fig. 2 is a view partially in section on lines 2—2 in Figs. 1 and 3 showing two adjacent tubes of separate pairs in their relation to the spacing and assembling means.

Fig. 3 is a transverse section on line 3—3 in Fig. 2 through two pairs of tubes showing the relation of the spacing and assembling means therewith.

Fig. 4 is a section similar to that shown in Fig. 3 involving three instead of two pairs of tubes.

Fig. 5 is a perspective of the spacing and assembling element.

Similar reference characters have been employed to designate similar parts throughout the several views.

Each unit pair of tubes comprises two tubes, 10 and 11, joined together at one end by a fitting consisting of a short length, 12, of a pipe of sufficiently larger bore so that when it is flattened on opposite sides to the diameter of the respective tubes, 10 and 11, it will receive both of these tubes. The tubes, 10 and 11, are provided with outstanding circumferential beads, 13, adjacent the ends which assemble with piece, 12, so that they will not slip too far into the piece, 12, and the centers of the flattened sides of the piece, 12, are pressed inwardly to more perfectly engage the tubes, 10 and 11. After these parts have been thus assembled, as shown in Figs. 1 and 2, the tubes, 10 and 11, are united with the piece, 12, by melting a rod of copper or copper composition so that the metal will run between the tubes, 10 and 11, and the piece, 12, and thereby form a substantially welded joint between these parts. Adjacent the rear edge of the piece, 12, I provide a plurality, preferably four interiorally extending embossments, 14, to support the inner edge of a closure plate, 15, which is united with the piece, 12, by welding in the same manner as heretofore described.

As will be perceived the fitting which joins one end of the tubes, 10 and 11, will prevent the separation of these tubes at their attached ends, and tend to hold them in parallel relation throughout their length, but, of course, with less dependability as the tubes extend further and further from the joining fitting.

To space the tubes of the same pair and respective pairs from each other, I provide a structure of cross form as shown in Figs. 3, 4 and 5. The member of the cross, 16, which extends between tubes of the same pair is extended and bifurcated as shown at 17, in Fig. 5, the bifurcated ends being turned in opposite directions to provide ears, 18, which partially encircle the adjacent tubes. The member 19 of the cross which extends between the tubes of adjacent pairs need not be formed with engaging ears such as 18. When the tubes of two pairs are brought adjacent and parallel to each other the spacing and assemblying piece is slipped between the ununited ends of the tubes and slid along to the desired position when the relation of the parts will be as shown in Fig. 3.

It will be seen, by reference to Fig. 1, that tubes 10 and 11 can not separate by reason of the connection 12 between their ends; and that when two or more groups of interconnected tubes are disposed as shown in Figs. 3 and 4, the respective groups will be held together in one general group by the ears 18. It will further be appreciated that by employing two of my spacing and securing elements with the curved arms at right angles to each other four or more tubes not otherwise interconnected may be spaced and secured together.

As will be seen in Fig. 4, this principle of spacing and assembling may be extended to three or more pairs of tubes, and when the spacer and assembler is applied to the desired number of tubes, the tubes will not only be spaced as desired, but the respective pairs held in desired assembly.

Having described my invention what I claim as new and desire to secure by Letters Patent is—

1. A tube assembly for heat transfer devices comprising a plurality of groups of tubes, each group of tubes being joined together and communicating at one end, and a spacing and securing element of cross form, the arms of which cross extend respectively between the tubes of each and adjacent groups, the arms of said cross which extend between tubes of each group being extended to partially encircle said tubes.

2. A tube assembly for heat transfer devices comprising a plurality of pairs of tubes, each pair of tubes being joined together so that they communicate at one end, and a spacing and securing element of cross form, the arms of which cross extend respectively between the tubes of each pair and between adjacent pairs, the arms of said cross which extend between tubes of a pair being bifurcated and curved in opposite directions to partially encircle said tubes.

3. A tube assembly comprising a plurality of groups of tubes, each group of tubes being joined together at an independent point, and a spacing and securing element of cross form, the arms of which cross extend respectively between the tubes of each and adjacent groups, the arms of said cross which extend between tubes of each group being bifurcated and curved in opposite directions to partially encircle said tubes.

4. A tube assembly for submerged water heaters comprising a plurality of groups of tubes, each group of tubes being joined together and communicating at one end, and a spacing and securing element of cross form, the arms of which cross extend respectively between the tubes of each and adjacent groups, the arms of said cross which extend between tubes of each group being bifurcated and curved in opposite directions to partially encircle said tubes.

5. A tube assembly for submerged water heaters comprising a plurality of groups of tubes, each group of tubes being joined together and communicating at one end, and spacing and securing elements, the arm of which extend respectively between the tubes of each and adjacent groups, said arms being bifurcated and curved in opposite directions to partially encircle said tubes.

6. A spacing and securing element for a tube assembly of cross form the ends of the arms in one plane being formed to partially encircle tubes disposed adjacent thereto.

WALTER A. DALEY.